US012614502B2

(12) United States Patent
Hou et al.

(10) Patent No.: US 12,614,502 B2
(45) Date of Patent: Apr. 28, 2026

(54) ADAPTIVE MULTI-AREA FRAME RATE DISPLAY SYSTEM AND ADAPTIVE MULTI-AREA FRAME RATE DISPLAY METHOD

(71) Applicant: Novatek Microelectronics Corp., Hsinchu (TW)

(72) Inventors: Yen-Ju Hou, Hsinchu County (TW); Chang-Sheng Tseng, Taoyuan City (TW); Chia-Wei Chang, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/664,309

(22) Filed: May 15, 2024

(65) Prior Publication Data

US 2025/0095539 A1 Mar. 20, 2025

Related U.S. Application Data

(60) Provisional application No. 63/538,851, filed on Sep. 18, 2023.

(30) Foreign Application Priority Data

Dec. 21, 2023 (TW) ................................ 112149966

(51) Int. Cl.
*G09G 3/20* (2006.01)

(52) U.S. Cl.
CPC ....... *G09G 3/2096* (2013.01); *G09G 2310/04* (2013.01); *G09G 2320/10* (2013.01);
(Continued)

(58) Field of Classification Search
CPC ............ G09G 3/2096; G09G 2310/04; G09G 2320/10; G09G 2330/021; G09G 2340/0435; G09G 2354/00; G09G 2370/00
See application file for complete search history.

(56) References Cited

U.S. PATENT DOCUMENTS

2014/0118399 A1 5/2014 Todorovich et al.
2016/0042708 A1 * 2/2016 Wang .................. G09G 3/3611 345/214

FOREIGN PATENT DOCUMENTS

CN 110164356 8/2019
CN 111462710 7/2020
(Continued)

OTHER PUBLICATIONS

"Office Action of Taiwan Counterpart Application", issued on Oct. 15, 2024, p. 1-p. 6.

*Primary Examiner* — Temesghen Ghebretinsae
*Assistant Examiner* — Karin Kiyabu
(74) *Attorney, Agent, or Firm* — JCIPRNET

(57) ABSTRACT

An adaptive multi-area frame rate display system and a method employed are provided. The method includes: dividing a display panel into a plurality of display areas and setting a plurality of compensation parameter sets corresponding to a plurality of frame rates; receiving display stream data; controlling the plurality of display areas of the display panel to display an image corresponding to the display stream data; performing a multi-area frame rate calculation operation to obtain a frame rate of each of the plurality of display areas; and, for each of the display areas, applying the compensation parameter set to which the frame rate of each of the display areas corresponds, so as to compensate an image subsequently displayed in each of the display areas.

14 Claims, 12 Drawing Sheets

(52) U.S. Cl.
CPC ................. *G09G 2330/021* (2013.01); *G09G 2340/0435* (2013.01); *G09G 2354/00* (2013.01); *G09G 2370/00* (2013.01)

(56) References Cited

FOREIGN PATENT DOCUMENTS

| | | | | |
|---|---|---|---|---|
| CN | 113421512 | | | 9/2021 |
| CN | 113421512 | A | * | 9/2021 |
| JP | 2018191143 | A | * | 11/2018 |
| TW | 202137188 | | | 10/2021 |
| TW | I804281 | | | 6/2023 |

* cited by examiner

ADAPTIVE MULTI-AREA FRAME RATE DISPLAY SYSTEM AND ADAPTIVE MULTI-AREA FRAME RATE DISPLAY METHOD

CROSS-REFERENCE TO RELATED APPLICATION

This application claims the priority benefit of U.S. provisional application Ser. No. 63/538,851, filed on Sep. 18, 2023 and Taiwan application serial no. 112149966, filed on Dec. 21, 2023. The entirety of the above-mentioned patent application is hereby incorporated by reference herein and made a part of this specification.

BACKGROUND OF THE INVENTION

Field of the Invention

The invention relates to a display system, and in particular to an adaptive multi-area frame rate display system and an adaptive multi-area frame rate display method.

Description of Related Art

With the advancement of display techniques, more and more displays may support higher screen update rates to support higher frame rates, making the display screen smoother and improving the user's visual experience. However, as the display frame rate is increased, the power consumption of the display is also increased significantly.

SUMMARY OF THE INVENTION

The invention provides an adaptive multi-area frame rate display system. The system includes: a display panel divided into a plurality of display areas; an application processor providing display stream data, wherein the display stream data includes a plurality of partial area display stream data corresponding to the plurality of display areas; and a display driver chip coupled to the display panel and the application processor, receiving the display stream data, and calculating a frame rate of each of the plurality of display areas, wherein the display driver chip further selects a plurality of compensation parameter sets corresponding to the plurality of display areas according to the frame rate of each of the plurality of display areas to compensate the plurality of partial area display stream data corresponding to the plurality of display areas.

In an embodiment of the invention, the display driver chip sets a position, a size, and a total number of the plurality of display areas according to at least one of a plurality of specifications corresponding to the display panel. The plurality of specifications include: a total number of a plurality of data lines of the display panel; and a total number of a plurality of scan lines of the display panel.

In an embodiment of the invention, in the operation of calculating the frame rate of each of the plurality of display areas, the display driver chip calculates the frame rate of each of the plurality of display areas according to an image update status of the plurality of display areas in a past default counting period.

In an embodiment of the invention, the display driver chip sets a plurality of area count registers respectively corresponding to the plurality of display areas according to the plurality of divided display areas. In the operation of calculating the frame rate of each of the plurality of display areas according to the image update status of the plurality of display areas in the past default counting period: after each display of a latest image frame of the display stream data, the area count register of each of the display areas counts a total number of times each of the display areas is updated in the past default counting period as a number of area updates, wherein the display driver chip calculates the frame rate of each of the display areas according to the number of area updates of each of the display areas and the default counting period.

In an embodiment of the invention, the display driver chip calculates a frame rate (MAFR(i)) of an i-th display area according to a following formula:

$$MAFR(i) = \frac{C_i}{P_{prset}} \times FUR_{max}$$

wherein $C_i$ is a number of area updates of the i-th display area; $P_{prset}$ is the default counting period; $FUR_{max}$ is a maximum frame rate of the display panel.

In an embodiment of the invention, the display driver chip sets a plurality of frame count registers respectively corresponding to the plurality of display areas according to the plurality of divided display areas, wherein each of the frame count registers has a plurality of bits, a total number of the plurality of bits corresponds to a length of the default counting period, and a plurality of bit values recorded by the plurality of bits respectively indicate an update status of a plurality of image frames in the past default counting period, wherein whenever an image of a display area is updated in a latest image frame, the frame count register corresponding to the display area discards the bit value corresponding to an earliest image frame in the plurality of bit values, performs a translation on a plurality of remaining bit values so that the bit corresponding to the latest image frame is empty, and records a first value to the bit corresponding to the latest image frame, wherein whenever the image of the display area is not updated in the latest image frame, the frame count register corresponding to the display area discards the bit value corresponding to the earliest image frame in the plurality of bit values, performs the translation on the plurality of remaining bit values so that the bit corresponding to the latest image frame is empty, and records a second value to the bit corresponding to the latest image frame.

In an embodiment of the invention, in the operation of counting the total number of times each of the display areas is updated in the past default counting period, the area count register of each of the display areas accumulates a plurality of bit values recorded in a corresponding frame count register to obtain a sum, wherein the area count register of each of the display areas records the sum, and the sum is the total number of times each of the display areas is updated in the past default counting period.

In an embodiment of the invention, the display driver chip sets a length of the default counting period according to a maximum frame rate of the display panel, wherein the maximum frame rate is a multiple of the default counting period.

In an embodiment of the invention, the display driver chip issues a forced update instruction every default counting period to control the display panel to update the images of all of the display areas every default counting period.

In an embodiment of the invention, the display driver chip further calculates the frame rate of each of the plurality of display areas at one of following opportunities: after an image of each image frame of the display stream data is displayed; when the display driver chip receives a command from the application processor to perform a local scanning or a power-saving mode; when the display driver chip determines that the display panel is displaying an image and a touch operation is not detected in a predetermined time; and when the display driver chip receives an instruction of the local scanning from the application processor and the touch operation is not detected in another predetermined time.

Another embodiment of the invention provides an adaptive multi-area frame rate display method configured for an adaptive multi-area frame rate display system. The system includes a display panel, an application processor, and a display driver chip. The method includes: dividing the display panel into a plurality of display areas via the display driver chip; providing display stream data via an application processor, wherein the display stream data includes a plurality of area display stream data corresponding to the plurality of display areas; receiving the display stream data from the application processor and calculating a frame rate of each of the plurality of display areas via the display driver chip; and selecting a plurality of compensation parameter sets corresponding to the plurality of display areas according to the frame rate of each of the plurality of display areas via the display driver chip to compensate the plurality of area display stream data corresponding to the plurality of display areas.

In an embodiment of the invention, the method further includes: setting a position, a size, and a total number of the plurality of display areas according to at least one of a plurality of specifications corresponding to the display panel. The plurality of specifications include: a total number of a plurality of data lines of the display panel; and a total number of a plurality of scan lines of the display panel.

In an embodiment of the invention, the step of calculating the frame rate of each of the plurality of display areas includes: calculating the frame rate of each of the plurality of display areas according to an image update status of the plurality of display areas in a past default counting period.

In an embodiment of the invention, the method further includes: setting a plurality of area count registers respectively corresponding to the plurality of display areas according to the plurality of divided display areas via the display driver chip. In particular, the step of calculating the frame rate of each of the plurality of display areas according to the image update status of the plurality of display areas in the past default counting period includes: counting a total number of times each of the display areas is updated in the past default counting period as a number of area updates via the area count register of each of the display areas after each display of a latest image frame of the display stream data; and calculating the frame rate of each of the display areas according to the number of area updates of each of the display areas and the default counting period via the display driver chip.

In an embodiment of the invention, the method further includes: calculating a frame rate (MAFR(i)) of an i-th display area according to a following formula via the display driver chip:

$$MAFR(i) = \frac{C_i}{P_{prset}} \times FUR_{max}$$

wherein $C_i$ is a number of area updates of the i-th display area; $P_{prset}$ is the default counting period; $FUR_{max}$ is a maximum frame rate of the display panel.

In an embodiment of the invention, the method further includes: setting a plurality of frame count registers respectively corresponding to the plurality of display areas according to the plurality of divided display areas via the display driver chip, wherein each of the frame count registers has a plurality of bits, a total number of the plurality of bits corresponds to a length of the default counting period, and a plurality of bit values recorded by the plurality of bits respectively indicate an update status of a plurality of image frames in the past default counting period; discarding a bit value corresponding to an earliest image frame in the plurality of bit values, performing a translation on a plurality of remaining bit values so that the bit corresponding to a latest image frame is empty, and recording a first value to the bit corresponding to the latest image frame via the frame count register corresponding to a display area whenever an image of the display area is updated in the latest image frame; and discarding the bit value corresponding to the earliest image frame in the plurality of bit values, performing the translation on the plurality of remaining bit values so that the bit corresponding to the latest image frame is empty, and recording a second value to the bit corresponding to the latest image frame via the frame count register corresponding to the display area whenever the image of the display area is not updated in the latest image frame.

In an embodiment of the invention, the step of counting the total number of times each of the display areas is updated in the past default counting period includes: accumulating a plurality of bit values recorded in a corresponding frame count register via the area count register of each of the display areas to obtain a sum; and recording the sum via the area count register of each of the display areas, wherein the sum is the total number of times each of the display areas is updated in the past default counting period.

In an embodiment of the invention, the method further includes: setting a length of the default counting period according to a maximum frame rate of the display panel via the display driver chip, wherein the maximum frame rate is a multiple of the default counting period.

In an embodiment of the invention, the method further includes: issuing a forced update instruction every default counting period via the display driver chip to control the display panel to update the images of all of the display areas every default counting period.

In an embodiment of the invention, the method further includes: calculating the frame rate of each of the plurality of display areas at one of following opportunities via the display driver chip: after an image of each image frame of the display stream data is displayed; when the display driver chip receives a command from the application processor to perform a local scanning or a power-saving mode; when the display driver chip determines that the display panel is displaying an image and a touch operation is not detected in a predetermined time; and when the display driver chip receives an instruction of the local scanning from the application processor and the touch operation is not detected in another predetermined time.

Based on the above, the adaptive multi-area frame rate display system and the adopted adaptive multi-area frame rate display method provided by the invention may adaptively obtain the frame rate of each of the display areas and apply the corresponding optical compensation parameters. In this system, even if the application processor or the host processor does not specify the specific frame rate of each of the display areas, the display driver chip may still adaptively calculate the current frame rate of each of the display areas and apply the corresponding compensation parameter set, thus eliminating the need of external control. Therefore, the need for the application processor (AP) to issue an instruction to instruct each of the display areas to refresh is eliminated, making the entire display process more autonomous and efficient, simplifying the operation process, reducing resource consumption and improving display efficiency, thus effectively overcoming the issues existing in traditional methods, that is, a large amount of resources need to be invested in compensation adjustments while saving energy.

DESCRIPTION OF THE EMBODIMENTS

In current screen update techniques, the method of updating different areas of the display at different frequencies has gradually become mainstream. One object of such a practice is to save energy. For example, when the main area of the screen may be updated at 120 Hz due to displaying video, the information at the top and bottom of the screen does not need to be updated as frequently as dynamic images. Therefore, the image update speed in some areas may be reduced, such as 10 Hz and 1 Hz, to achieve the object of reducing power consumption. It is worth noting that the update instructions of these areas are issued by the application processor, meaning that specific areas are updated only when necessary. Taking into account the maximization of energy efficiency, the area is driven only when the screen of a specific area on the panel needs to be updated, thus avoiding unnecessary energy consumption.

Moreover, taking a handheld device as an example, since the frame rate of different areas on the display panel needs to be instructed by the application processor, only the panel drive circuit may reduce the frame rate of the panel to achieve the above object. However, if the application processor does not provide the panel drive circuit with information about the frame rate, the panel drive circuit may also not be able to achieve the above effect.

Furthermore, for specific display techniques, such as OLED panels, differences in frame rate lead to changes in optical compensation. Taking the frame rate of 120 Hz and 1 Hz as an example, the desired Gamma values thereof may be different. In other words, when the function of multi-area driver display is adopted, suitable optical compensation also needs to be correspondingly made.

However, while this technique has energy advantages, it also introduces some challenges. Especially in the common usage scenarios of mobile phones, the application processor needs to bear additional computational burden due to various possible combinations of areas and frame rates. The application processor not only has to determine the frame rate of each area in real time, but also needs to dynamically adjust the compensation strategy of each area, thus undoubtedly consuming a lot of processing resources and time.

In other words, although traditional area driving operations improve energy efficiency, they increase the computational burden of the application processor, especially when the frame rate and the corresponding compensation strategy of each area need to be instantly determined. In addition, OLED panels need different optical compensation at different frame rates, thus increasing the complexity of the system. Therefore, how to ensure energy efficiency while also reducing the computational burden of the application processor and ensuring that optical compensation is effectively applied to display areas of different frame rates has become one of the issues addressed in the disclosure content.

Figure 1A:
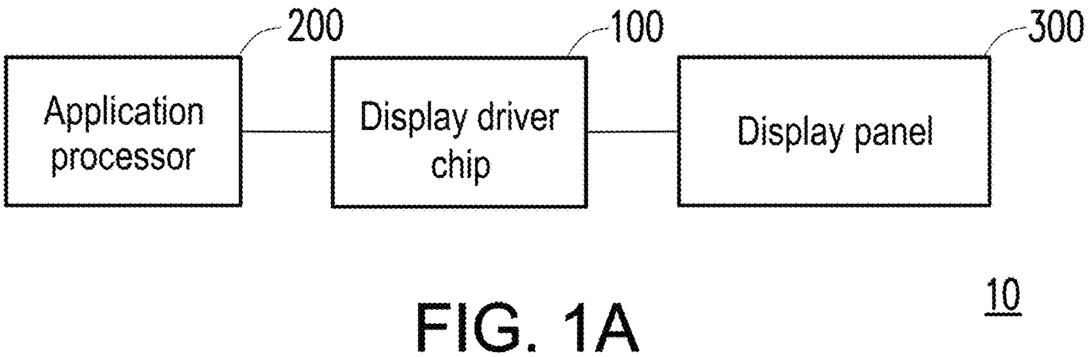
FIG. 1A is a block diagram of an adaptive multi-area frame rate display system shown according to an embodiment of the invention.

Referring to FIG. 1, in the present embodiment, an adaptive multi-area frame rate display system 10 includes a display driver chip (display driver integrated circuit, DDIC) 100, an application processor (AP) 200, and a display panel 300. The display driver chip 100 is electrically connected to the application processor 200 and the display panel 300. The display panel 300 is configured to display a screen. The application processor 200 is configured to provide display stream data. The display stream data includes a plurality of image frame data arranged according to the timing of each frame. In an embodiment, the application processor 200 may also be replaced by a microcontroller (MCU) or a general-purpose processor.

Figure 1B:
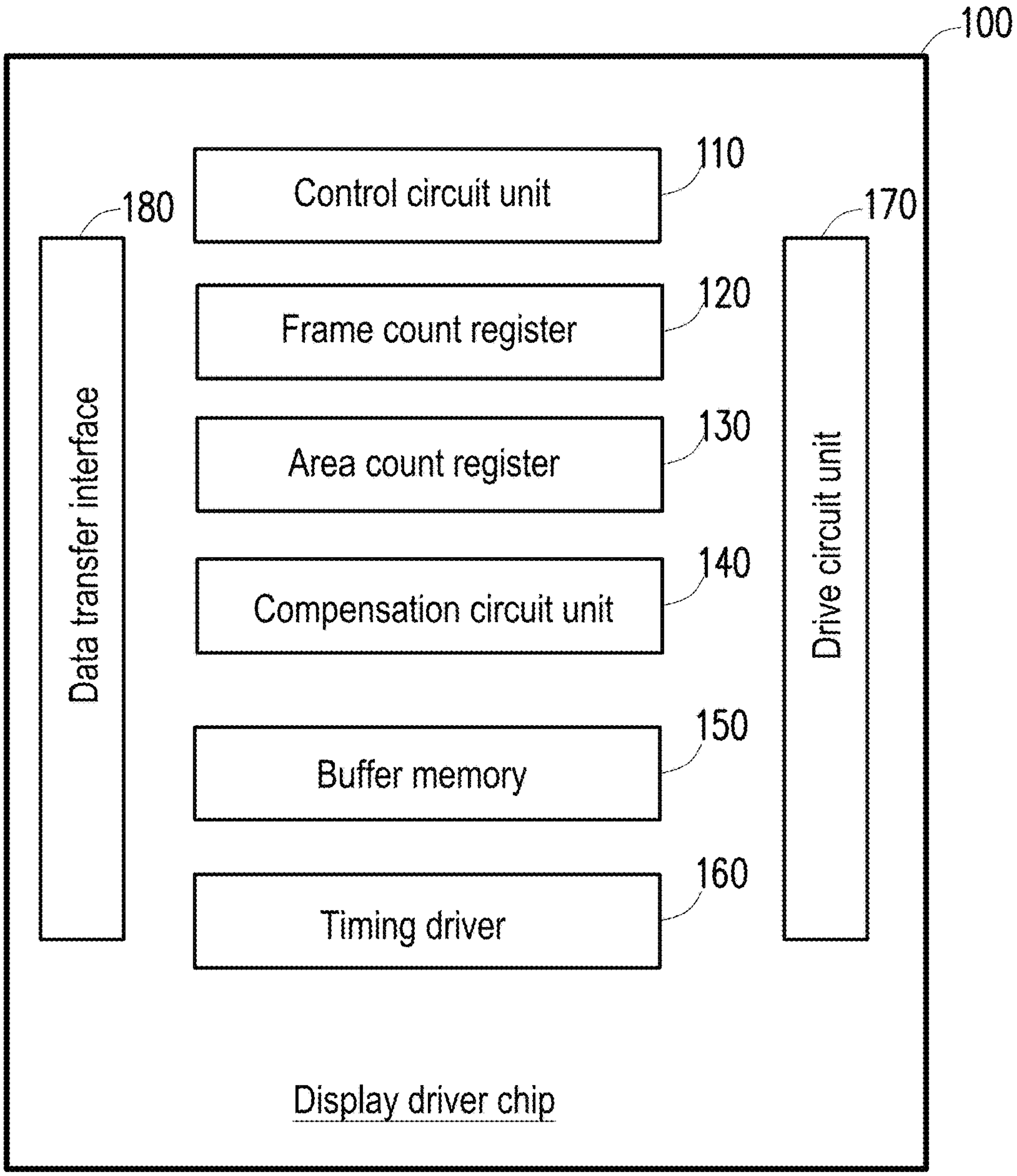
FIG. 1B is a block diagram of a display driver chip shown according to an embodiment of the invention.

Please refer to FIG. 1B. In the present embodiment, the display driver chip 100 includes a control circuit unit 110, a frame count register 120, an area count register 130, a compensation circuit unit 140, a buffer memory 150, a timing driver 160, a drive circuit unit 170, and a data transfer interface 180. The control circuit unit 110 is electrically connected to other elements.

The control circuit unit 110 is configured to control the overall operation of the display driver chip 100. The frame count register 120 is configured to record the update status of each of the display areas in each of the frames. The area count register 130 is configured to record the number of image frame updates of each of the display areas in a default counting period. Via the frame count register 120 and the area count register 130, the control circuit unit 110 may estimate the frame rate of different areas on the display panel 300 without being informed of the frame rate by the application processor 200. In other words, the control circuit unit 110 does not need information of the application processor 200, but only estimates the relative frame rates of different areas on the display panel 300 according to the display stream data transmitted by the application processor 200 via the MIPI interface. For example, when executing a specific application, the image information received by the display panel 300 from the application processor 200 is divided into two portions. The upper portion is the streaming image, and the frame rate thereof is 120 Hz. The lower portion is the message of the user, and the frame rate thereof is 5 Hz.

Since the application processor 200 does not transmit the frame rate information to the display driver chip 100, the control circuit unit 110 may only know that the upper half of the display panel 300 is continuously updated via the frame count register 120 and the area count register 130, and the image in the lower half area is not continuously updated. When the control circuit unit 110 estimates the frame rate of the lower half area of the display panel 300, the frame rate may be estimated to be 10 Hz. Although this may be different from the 5 Hz frame rate in the data transmitted by the application processor 200, it is enough to significantly reduce the power consumed. Although the control circuit unit 110 may not accurately estimate the frame rate of the display panel 300 at the beginning, as time goes by, the control circuit unit 110 may more accurately estimate the frame rate of the display stream data.

The compensation circuit unit 140 is configured to store various compensation parameter sets, and each of the compensation parameter sets includes different types of compensation parameters, such as Gamma, deMURA, source voltage compensation, gate voltage compensation, chroma, brightness, contrast, initialization voltage Vinit, gate timing compensation, source timing compensation. Each of the compensation parameter sets is set to correspond to one or a plurality of frame rates. In an embodiment, the compensation circuit unit 140 directly records one mapping table so that the control circuit unit 110 may query the compensation parameter set corresponding to the specified frame rate according to the specified frame rate. In short, the compensation parameter set may correspond to one frame rate or one frame rate range. When the control circuit unit 110 determines that the frame rates of different display areas on the display are different, different compensation parameter settings are used.

The buffer memory 150 is configured to temporarily store data, such as a portion of the received image stream data, the current frame rate of each of the display areas, the compensation parameter set of each of the display areas, etc. The buffer memory 150 is, for example, a dynamic random-access memory (DRAM) or a static random-access memory (SRAM), etc.

The timing driver 160 is configured to transmit the control signal from the control circuit unit 110 to the drive circuit unit 170 to control the drive circuit unit 170 configured to transmit display data to a plurality of pixels of the display panel 300, then transmit the display data to the corresponding data line and drive the corresponding scan line according to the timing. The data transfer interface 180 is configured to be electrically connected to the application processor 200 to establish a data connection to transfer data.

The control circuit unit 110, the frame count register 120, the area count register 130, and the compensation circuit unit 140 may be hardware having logic capabilities and computing capabilities. Examples include programmable microprocessor, application-specific integrated circuit (ASIC), programmable logic device (PLD), or other similar devices.

In another embodiment, the frame counting register 120, the area count register 130, and the compensation circuit unit 140 may all be implemented as software or firmware code modules to be executed by the control circuit unit 110, thereby implementing corresponding functions.

The display panel 300 may include, for example, an organic light-emitting diode (OLED) display, or other types of displays, such as a liquid-crystal display (LCD), a light-emitting diode display (LED), or a field-effect emission display (FED). The display panel 200 may also include resistive, capacitive, or other types of touch sensing devices forming a portion of the display panel 200. In the present embodiment, the display panel 300 includes a plurality of scan lines and a plurality of data lines, and the intersection of each of the scan lines and data lines corresponds to one or a plurality of pixels.

Figure 2:
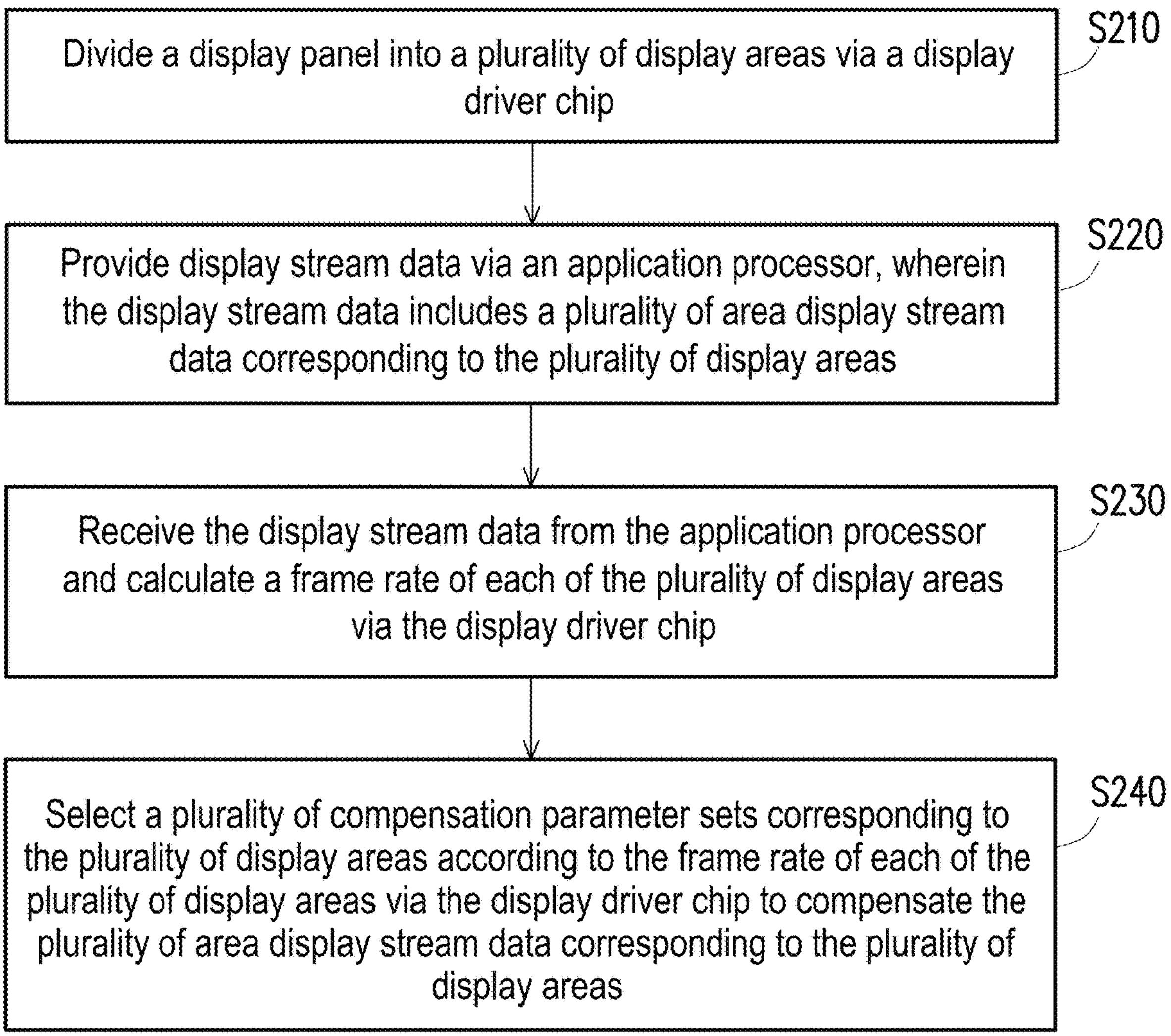
FIG. 2 is an operational flowchart of an adaptive multi-area frame rate display method shown according to an embodiment of the invention.

Referring to FIG. 2, in step S210, the display driver chip 100 divides the display panel 300 into a plurality of display areas. In addition, in an embodiment, the display driver chip 100 further sets a plurality of compensation parameter sets corresponding to a plurality of frame rates respectively.

Figure 4:
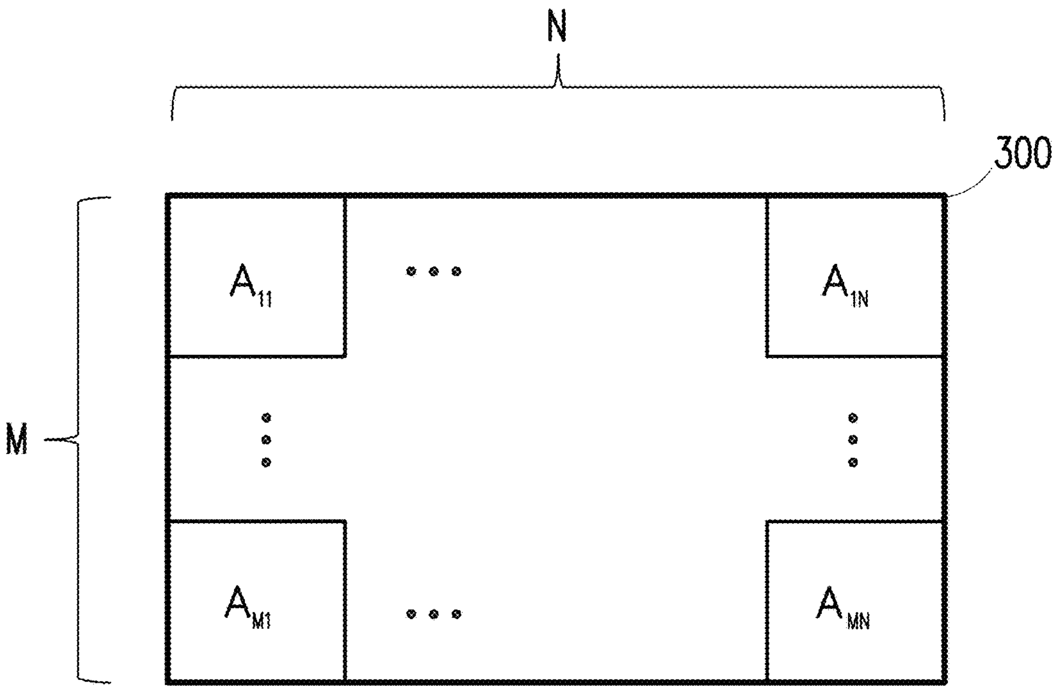
FIG. 4 is a schematic diagram of a plurality of display areas of a display panel shown according to an embodiment of the invention.

Specifically, the display driver chip 100 sets a position, a size, and a total number of the plurality of display areas according to at least one of a plurality of specifications corresponding to the display panel 300. The plurality of specifications include: a total number of a plurality of data lines of the display panel 300; and a total number of a plurality of scan lines of the display panel 300. For example, please refer to FIG. 4, the display driver chip 100 may divide the display panel 300 into M×N display areas $A_{11}$ to $A_{MN}$. N may be 1, 2, or other positive integers; M is a positive integer. For example, each of the display areas may be set to include up to m scan lines and up to n data lines according to the display driver procedure or the capabilities supported by the underlying hardware. That is, the most extreme example is that each of the display areas only has one scan line and one data line. In another embodiment, the display driver chip 100 treats the entire display panel 300 as one display area (having all scan lines and data lines). In addition, the size of each of the areas may be the same as or different from each other, and the invention is not limited thereto.

Next, in step S220, the application processor 200 is configured to provide display stream data, wherein the display stream data comprises a plurality of area display stream data corresponding to the plurality of display areas.

Next, in step S230, the display driver chip 100 receives the display stream data from the application processor 200 and calculates a frame rate of each of the plurality of display areas.

In the present embodiment, the display driver chip 100 controls the plurality of display areas of the display panel 300 to display images corresponding to the display stream data. It should be noted that, in an embodiment, when the display system 10 performs the first display operation (e.g., the first image frame) after being powered on, the display driver chip 100 may display the screens of all display areas using a default compensation parameter set. Then, as the display operation time goes by, each of the display areas is dynamically and adaptively adjusted to a suitable compensation parameter set.

Specifically, in the operation of calculating the frame rate of each of the plurality of display areas, the display driver chip 100 calculates a frame rate of each of the plurality of display areas according to an image update status of the plurality of display areas in a past default counting period. In the present embodiment, in the operation of calculating the frame rate of each of the plurality of display areas according to the image update status of the plurality of display areas in the past default counting period, after each display of a latest image frame of the display stream data, the area count register 130 of each of the display areas counts a total number of times each of the display areas is updated in the past default counting period as a number of area updates, wherein the display driver chip 100 calculates the frame rate of each of the display areas according to the number of area updates of each of the display areas and the default counting period.

In the present embodiment, the display driver chip 100 calculates a frame rate (MAFR(i)) of an i-th display area according to a following formula.

$$MAFR(i) = \frac{C_i}{P_{prset}} \times FUR_{max}$$

In particular, $C_i$ is a number of area updates of the i-th display area; $P_{prset}$ is the default counting period; $FUR_{max}$ is a maximum frame rate of the display panel. The actual value of the maximum frame rate (also called maximum refresh rate) is determined depending on the specifications of each of the display panels 300 itself.

In the present embodiment, the display driver chip 100 sets a length of the default counting period according to the maximum frame rate of the display panel 300, wherein the maximum frame rate is a multiple of the default counting period. For example, when the maximum frame rate is 120 Hz, the default counting period $P_{prset}$ may be set to a frame number such as 6, 12, 24, 120, etc. In the present embodiment, the display driver chip 100 records the image update status of the plurality of display areas in the past default counting period using the frame count register 120 and the area count register 130 to obtain the number of area updates $C_i$ of each of the display areas.

More specifically, the display driver chip 100 sets a plurality of frame count registers 120 respectively corresponding to the plurality of display areas according to the plurality of divided display areas. Each of the frame count registers 120 has a plurality of bits, the total number of the plurality of bits corresponds to the length of the default counting period (for example, corresponds to the default counting period with a length of 6 frames, the frame count register 120 has a total of 6 bits), and the plurality of bit values recorded by the plurality of bits respectively indicate the update status of the plurality of image frames in the past default counting period.

Figure 5:
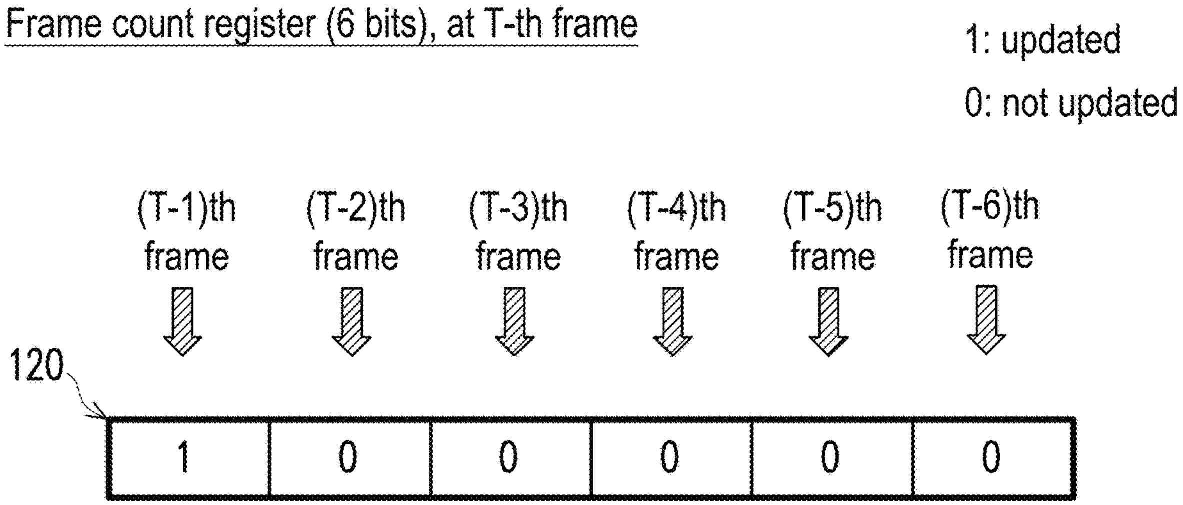
FIG. 5 is a schematic diagram of a frame count register shown according to an embodiment of the invention.

For example, referring to FIG. 5, it is assumed that the current image frame is the T-th, and the frame count register 120 corresponding to one display area has a total of 6 bits, wherein the total number of bits corresponds to the length of the default counting period (e.g., 6 frames). In particular, the first bit is configured to record the update status of the (T−1)th frame (the most recent image frame in the past) (for example, the image of the display area is updated at the (T−1)th frame, and is recorded as the first value "1"); the second bit is configured to record the update status of the (T−2)th frame (for example, the image of the display area is not updated at the (T−2)th frame, and is recorded as the second value "0"); and by analogy, the third to sixth bits respectively record the update statuses of the (T−3)th to (T−6)th frames of the display area (i.e., "0", "0", "0", "0"). The received display stream data instructs the display driver chip 100 which data line and scan line should be written or updated in each of the frames. Accordingly, the display driver chip may also determine which scan lines are updated, and then determine whether the display area to which the updated scan lines belong is updated. In an embodiment, if one display area contains a plurality of scan lines, and any of the scan lines is updated at the T-th frame, the display driver chip 100 determines that the image of this display area is updated once at the T-th frame. In another embodiment, the display driver chip 100 may set one default threshold value. When a plurality of scan lines exceeding the default threshold value in one display area are updated in the T-th frame, the display driver chip 100 determines that the image of this display area is updated once in the T-th frame.

Moreover, whenever an image of a display area is updated in a latest image frame, the frame count register 120 corresponding to the display area discards the bit value corresponding to an earliest image frame in the plurality of bit values, performs a translation on a plurality of remaining bit values so that a bit corresponding to the latest image frame is empty, and records a first value to the bit corresponding to the latest image frame. Whenever the image of the display area is not updated in the latest image frame, the frame count register 120 corresponding to the display area discards the bit value corresponding to the earliest image frame in the plurality of bit values, performs the translation on the plurality of remaining bit values so that the bit corresponding to the latest image frame is empty, and records a second value to the bit corresponding to the latest image frame.

Figure 6:
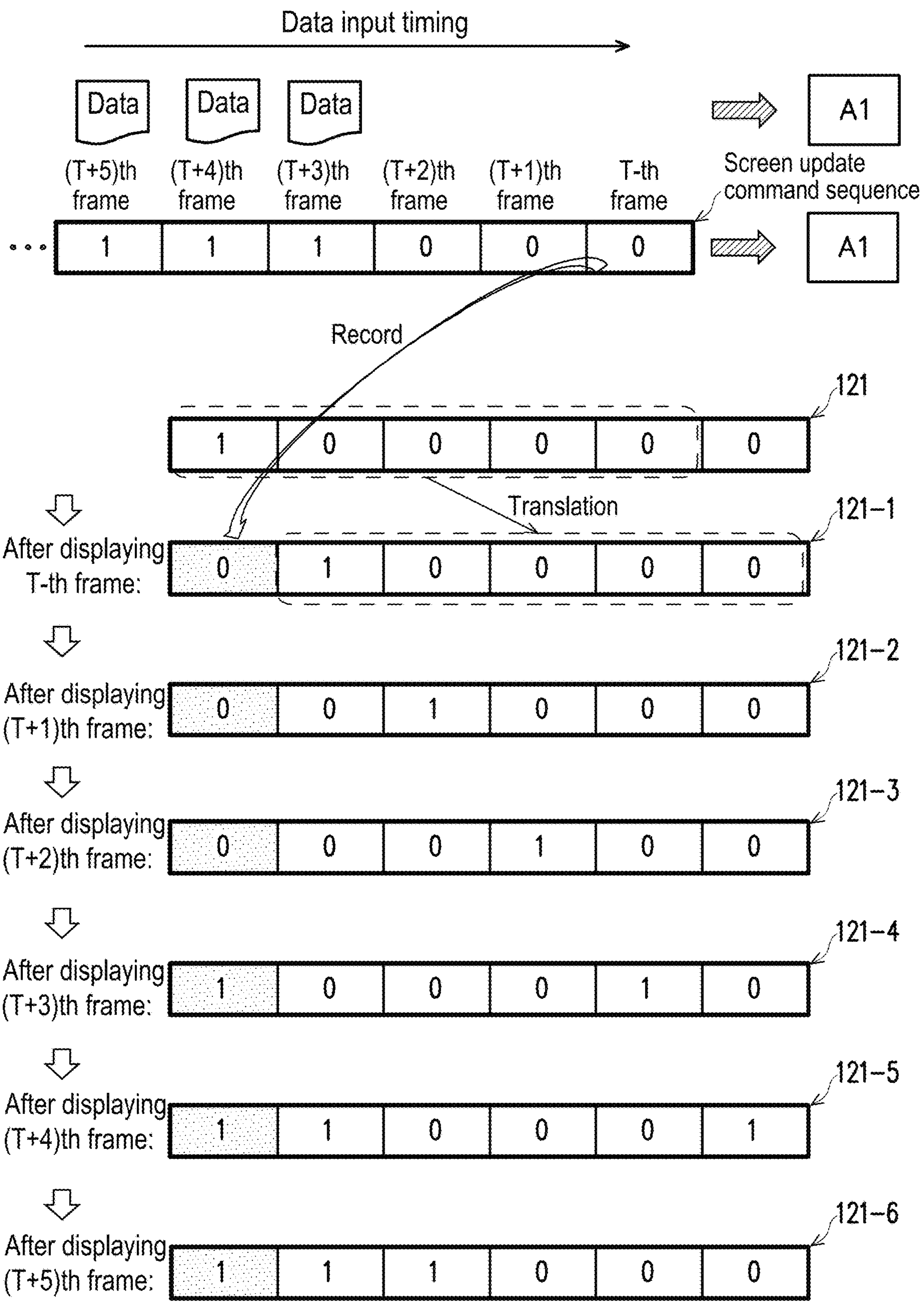
FIG. 6 is a schematic diagram of a frame count register recording frame updates shown according to an embodiment of the invention.

For example, referring to FIG. 6, for a display area A1, it is assumed that according to the received display stream data, the image of the display area A1 is not updated from the T-th frame to the (T+2)th frame, and the image of the display area A1 is only updated from the (T+3)th frame to the (T+5)th frame. The correspondingly generated screen update instruction sequence instructs not to drive (e.g., "0") the scan line of the display area A1 from the T-th frame to the (T+2)th frame, and instructs to drive (e.g., "1") the scan line of the display area A1 from the (T+3)th frame to the (T+5)th frame. In addition, it is further assumed that the bit value recorded in a frame count register 121 corresponding to the display area A1 is "100000".

In this example, as shown in FIG. 6, when displaying the image stream data of the T-th frame, image update is not performed in the display area A1, the frame count register 121 discards the last bit value, translates the remaining bit values, and correspondingly records the second value "0" to the first bit (gray bottom portion) to become a frame count register 121-1, and the bit value recorded thereby is "010000". By analogy, when displaying the image stream data of the (T+1)th frame, image update is not performed in the display area A1, the frame count register 121-1 translates the original bit value and correspondingly records the second value "0" to the first bit to become a frame count register 121-2, and the bit value recorded thereby is "001000"; when displaying the image stream data of the (T+2)th frame, image update is not performed in the display area A1, the frame count register 121-2 translates the original bit value and correspondingly records the second value "0" to the first bit to become a frame count register 121-3, and the bit value recorded thereby is "000100".

When displaying the image stream data of the (T+3)th frame, image update is not performed in the display area A1, the frame count register 121-3 translates the original bit value and correspondingly records the first value "1" to the first bit to become a frame count register 121-4, and the bit value recorded thereby is "100010"; when displaying the image stream data of the (T+4)th frame, image update is not performed in the display area A1, the frame count register 121-4 translates the original bit value and correspondingly records the first value "1" to the first bit to become a frame count register 121-5, and the bit value recorded thereby is "110001"; when displaying the image stream data of the (T+5)th frame, image update is not performed in the display area A1, the frame count register 121-5 translates the original bit value and correspondingly records the first value "1" to the first bit to become a frame count register 121-6, and the bit value recorded thereby is "111000".

In this way, according to the above mechanism, the frame count register 120 may effectively record the image update status of the corresponding display area in the past default counting period.

That is, using this binary registration system, the update history of each of the display areas in a specified frame time range (default counting period) may be quickly and effectively determined. Next, the area count register 130 of each of the display areas may count the total number of times each of the display areas is updated in the past default counting period as the number of area updates according to the plurality of bit values of the corresponding frame counting register.

More specifically, the area count register 130 of each of the display areas accumulates a plurality of bit values recorded in a corresponding frame count register 120 to obtain a sum. In particular, the area count register 130 of each of the display areas records the sum, and the sum is the total number of times each of the display areas is updated in the past default counting period (that is, the number of area updates of the corresponding display area). The number of bits of the area count register 130 depends on the length of the default counting period. For example, if the length of the default counting period is 12 frames, the area count register 130 may be set to a 4-bit value.

Figure 7:
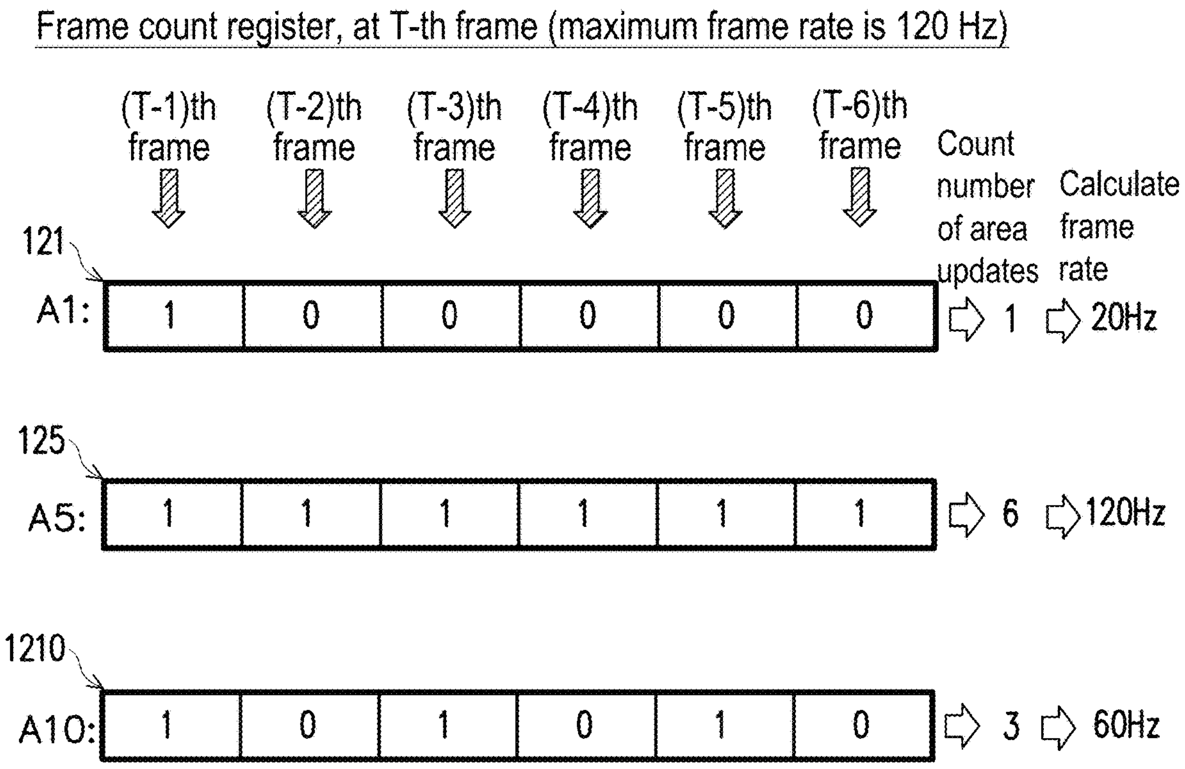
FIG. 7 is a schematic diagram of calculating a frame rate according to a plurality of bit values of a frame count register shown according to an embodiment of the invention.

For example, please refer to FIG. 7, it is assumed that the maximum frame rate of the display panel 300 is 120 Hz, and the default counting period is 6 frames. Moreover, it is further assumed that the plurality of bit values recorded in the frame count register 121 corresponding to the display area A1 are "100000"; the plurality of bit values recorded in a frame count register 125 corresponding to a display area A5 are "111111"; the plurality of bit values recorded in a frame count register 1210 corresponding to a display area A10 are "101010".

In this example, the area count register 130 corresponding to the display area A1 performs an accumulation operation on each of the bit values of the plurality of bit values of the frame count register 121 of "100000", i.e., 1+0+0+0+0+0, to obtain the final sum of "1". This sum is the number of area updates of the display area A1, and may be configured to calculate the frame rate of the display area A1. The calculated result is 20 Hz (⅙*120=20).

By analogy, the area count register 130 corresponding to the display area A5 performs an accumulation operation on each of the bit values of the plurality of bit values of the frame count register 125 of "111111" to obtain the final sum of "6", and may be configured to calculate the frame rate of the display area A5. The calculated result is 120 Hz: The area count register 130 corresponding to the display area A10 performs an accumulation operation on each of the bit values of the plurality of bit values of the frame count register 1210 of "101010" to obtain the final sum of "3", and may be configured to calculate the frame rate of the display area A10. The calculated result is 60 Hz.

Please return to FIG. 2. After the frame rate of each of the display areas is obtained, in step S240, the display driver chip 100 further selects a plurality of compensation parameter sets corresponding to the plurality of display areas according to the frame rate of each of the plurality of display areas to compensate the plurality of area display stream data corresponding to the plurality of display areas. That is, the display driver chip 100 adjusts/compensates the area display stream data corresponding to each of the display areas by applying a compensation parameter set corresponding to the frame rate of each of the display areas for each of the display areas, so as to compensate the image subsequently displayed in each of the display areas. In this way, the display driver chip 100 may effectively determine the frame rate of each of the display areas and perform corresponding compensation for a subsequent display image when the outside world (such as the application processor 200) does not provide the frame rate of each of the display areas via the above process steps.

Figure 8:
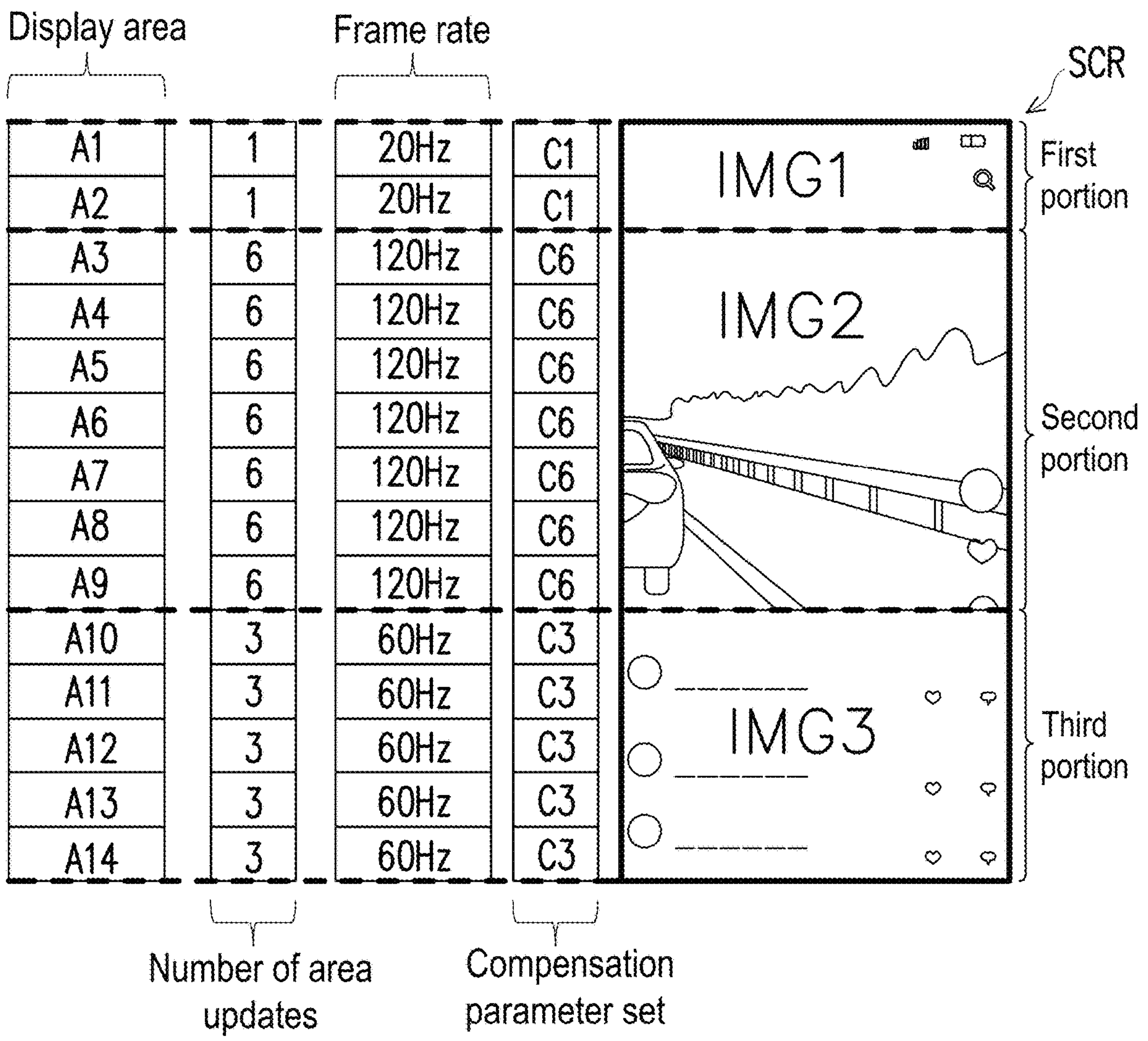
FIG. 8 is a schematic diagram of the application of a plurality of compensation parameter sets corresponding to multi-area frame rates to a plurality screen portions shown according to an embodiment of the invention.

For example, please refer to FIG. 8. In this example, it is assumed that a screen SCR displayed by the display system displays images IMG1 to IMG3 corresponding to the first to third portions respectively. In particular, the image IMG1 shows the interface or function bar of a video application; the image IMG2 shows the video screen played by the video application; the image IMG3 is the chat room message area corresponding to the video screen displayed by the video application. Moreover, it is further assumed that the maximum frame rate of the display panel is 120 Hz; the resolution of the display panel is 1080×2376, that is, the display panel has 1080 data lines and 2376 scan lines. Moreover, it is also assumed that the default counting period is 6, and the screen SCR displays the screen via the 14 divided display areas A1 to A14, wherein each of the display areas has a maximum of 170 scan lines (each has 1080 data lines).

As shown in FIG. 8, the least frequently updated image IMG1 corresponds to the display areas A1 and A2; the most frequently updated image IMG2 corresponds to the display areas A3 to A9; the image IMG3 corresponds to the display areas A10 to A14. Moreover, it is assumed that the number of counted area updates of the display areas A1 and A2 of the image IMG1 is 1; the number of counted area updates of the display areas A3 to A9 of the image IMG2 is 6; the number of counted area updates of the display areas A10 to A14 of the image IMG3 is 3.

According to the above example, the display driver chip 100 may correspondingly calculate that the frame rate of the display areas A1 and A2 of the image IMG1 is 20 Hz; the frame rate of the display areas A3 to A9 of the image IMG2 is 120 Hz; the frame rate of the display areas A10 to A14 of the image IMG3 is 60 Hz. Next, the display driver chip 100 may set the compensation parameter set of the display areas A1 and A2 of the image IMG1 to C1 corresponding to the frame rate of 20 Hz; set the compensation parameter set of the display area A3 to A9 of the image IMG2 to C6 corresponding to the frame rate of 120 Hz; set the compensation parameter set of the display areas A10 to A14 of the image IMG3 to C3 corresponding to the frame rate of 60 Hz.

Figure 3A:
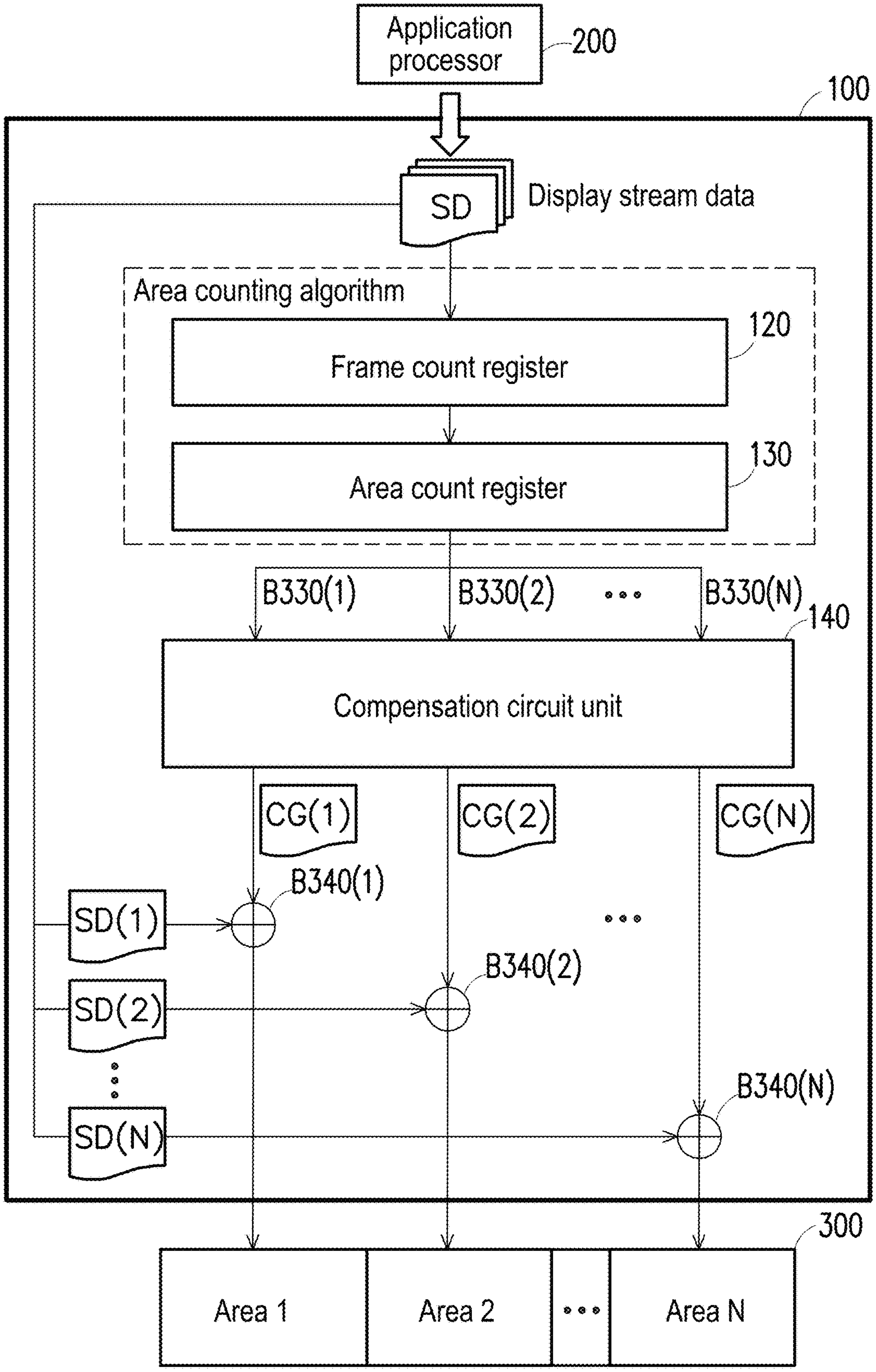
FIG. 3A is a schematic diagram of device interaction of an adaptive multi-area frame rate display system shown according to an embodiment of the invention.
Figure 3B:
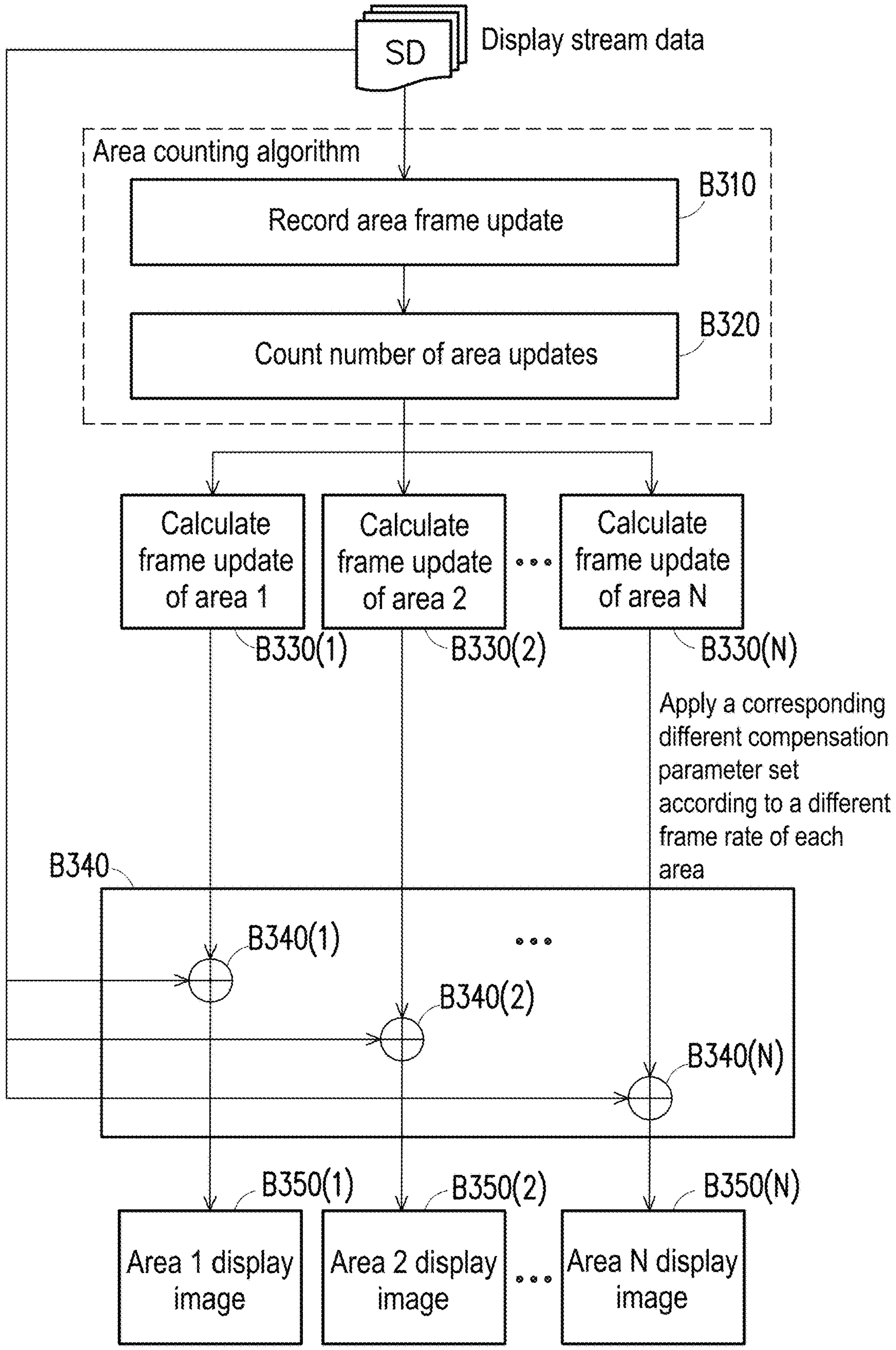
FIG. 3B is an operational schematic diagram of an adaptive multi-area frame rate display method shown according to an embodiment of the invention.

The following uses FIG. 3A and FIG. 3B to illustrate the step flow of the adaptive multi-area frame rate system and the adopted adaptive multi-area frame rate display method of the invention from another perspective. As shown in FIG. 3A and FIG. 3B, initially, the image source, such as the application processor 200, sends display stream data SD to the display driver chip 100. The control circuit (not shown) in the display driver chip 100 generates a plurality of area display stream data SD(1), SD(2), . . . , SD(N) respectively corresponding to a plurality of display areas (e.g., area 1 to area N of the display panel 300) (for example, the display stream data SD(1), SD(2), . . . , SD(N) may be generated by dividing the display stream data SD according to the plurality of display areas) according to the display stream data SD, which are configured to be provided to a plurality of corresponding display areas. In the present embodiment, the division of the display area and the corresponding division of the display stream data may be accomplished by the control circuit not shown in FIG. 3A. In another embodiment, the control circuit may be a timing driver 160.

Moreover, via the area counting algorithm, the frame counting register 120 of the display driver chip 100 continuously records the number of frame updates of each of the display areas (B310), so that the area count register 130 counts the number of area updates of each of the display areas (B320). Next, the display driver chip 100 calculates the frame rate of each of the display areas via the calculation method illustrated in the embodiment of FIG. 7 according to the number of area updates of each of the display areas (B330(1) to B330(N)). Next, the compensation circuit unit 140 applies corresponding different compensation parameter sets according to the different frame rate of each of the areas (B340). For example, the display stream data SD(1) to SD(N) of each of the display areas are adjusted by applying compensation parameter sets CG(1) to CG(N) corresponding to the areas 1 to N to the display stream data SD(1) to SD(N) corresponding to the areas 1 to N (B340(1) to B340(N)). Then, the display panel 300 receives the adjusted display stream data SD(1) to SD(N) to display the adjusted display stream data in each of the display areas (B350(1) to B350(N)), so that the images displayed in the area 1 to area N are compensated.

Figure 9A:
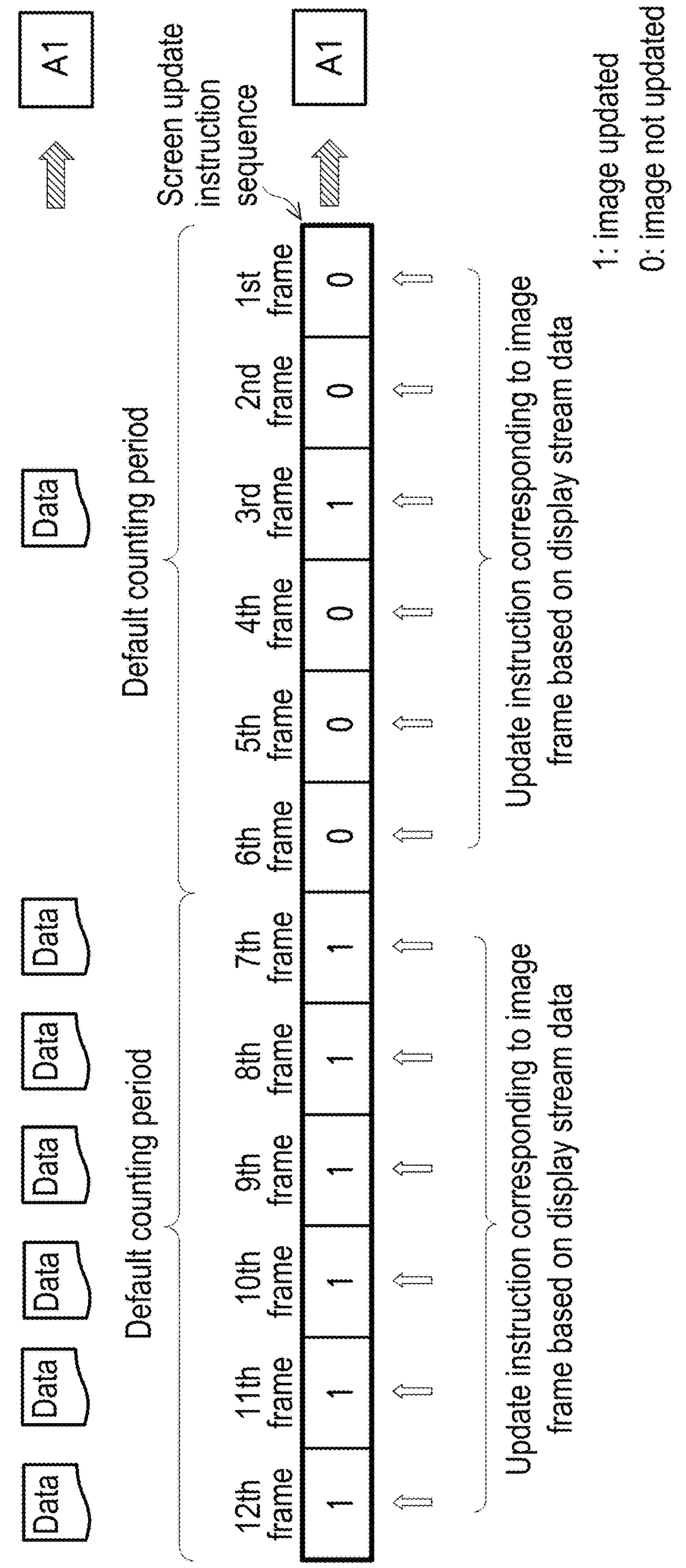
FIG. 9A is a schematic diagram of a screen update instruction sequence shown according to an embodiment of the invention.

Referring to FIG. 9A, in an embodiment, the display driver chip 100 controls the update of each of the display areas according to the received display stream data. For example, as shown in FIG. 9A, the display driver chip 100 inputs display data to the data lines in the display area A1 in the 3rd and 7th to 12th frames according to the display stream data. Moreover, the display driver chip 100 instructs ("1") to update the scan lines in the display area A1 in the 3rd and 7th to 12th frames according to the screen update instruction sequence generated by the display stream data.

In another embodiment, in order to maintain the lowest display quality, the display driver chip 100 performs a forced update every fixed time interval (e.g., a default counting period) to maintain basic image quality. For example, one or a plurality of frames are designated as primary refresh frames in a specific interval, that is, one mechanism is used to ensure a minimum frame rate. For example, it is stipulated that the first frame of every 6 frames needs to forcefully refresh all scan lines in all display areas. The subsequent 5 frames refresh the corresponding scan lines of different display areas according to the received display stream data. The display driver chip 100 may utilize one oscillator and a main frequency to handle timing operations.

Figure 9B:
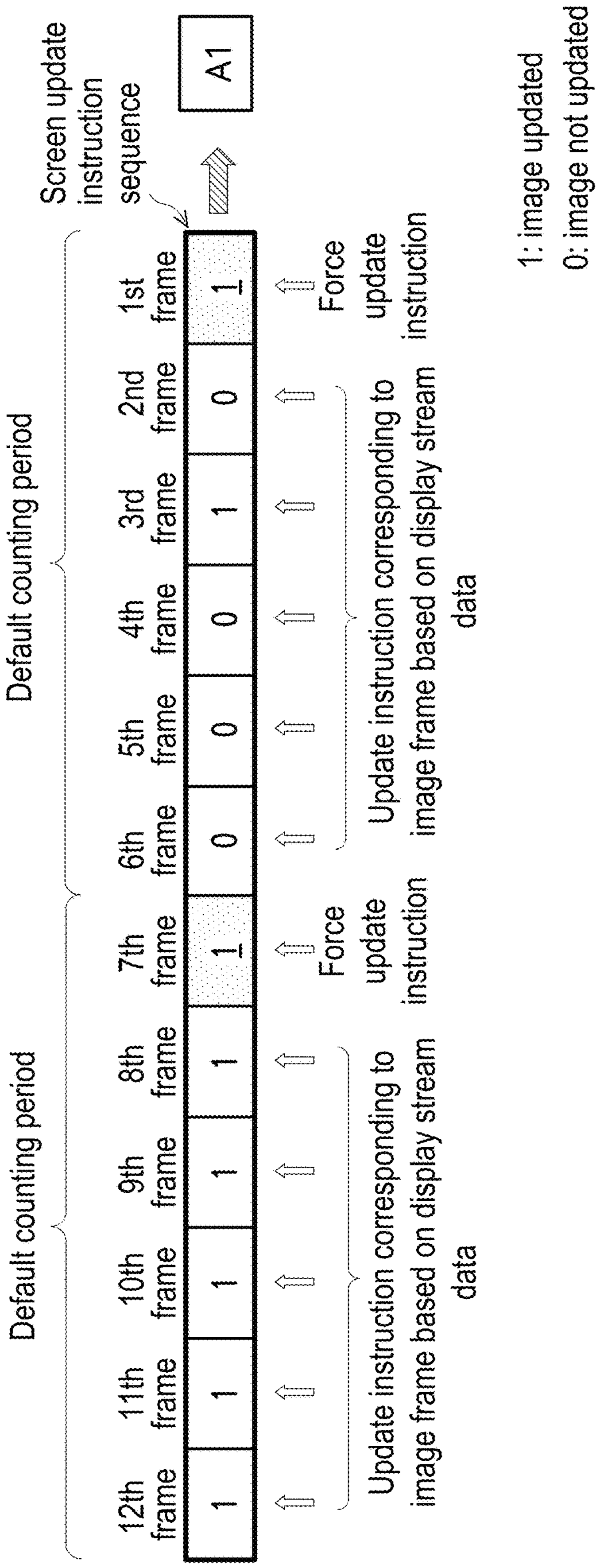
FIG. 9B is a schematic diagram of another screen update instruction sequence shown according to another embodiment of the invention.

For example, referring to FIG. 9B, similar to the example of FIG. 9A, the difference is that in the example of FIG. 9B, every default counting period is forcibly refreshed (using the forced update instruction). For example, in the 1st to 6th frames of the first default counting period, the 1st frame is selected to execute the forced update instruction (gray background) to update all of the display areas (even if no data is input to the display area A1 in the 1st frame). Similarly, in the 7th to 12th frames of the first default counting period, the 7th frame (the first frame) is selected to execute the forced update instruction (gray background) to update all of the display areas. It should be noted that the invention is not limited to the number and execution timing of the forced update instruction of each of the default counting periods.

Figure 10:
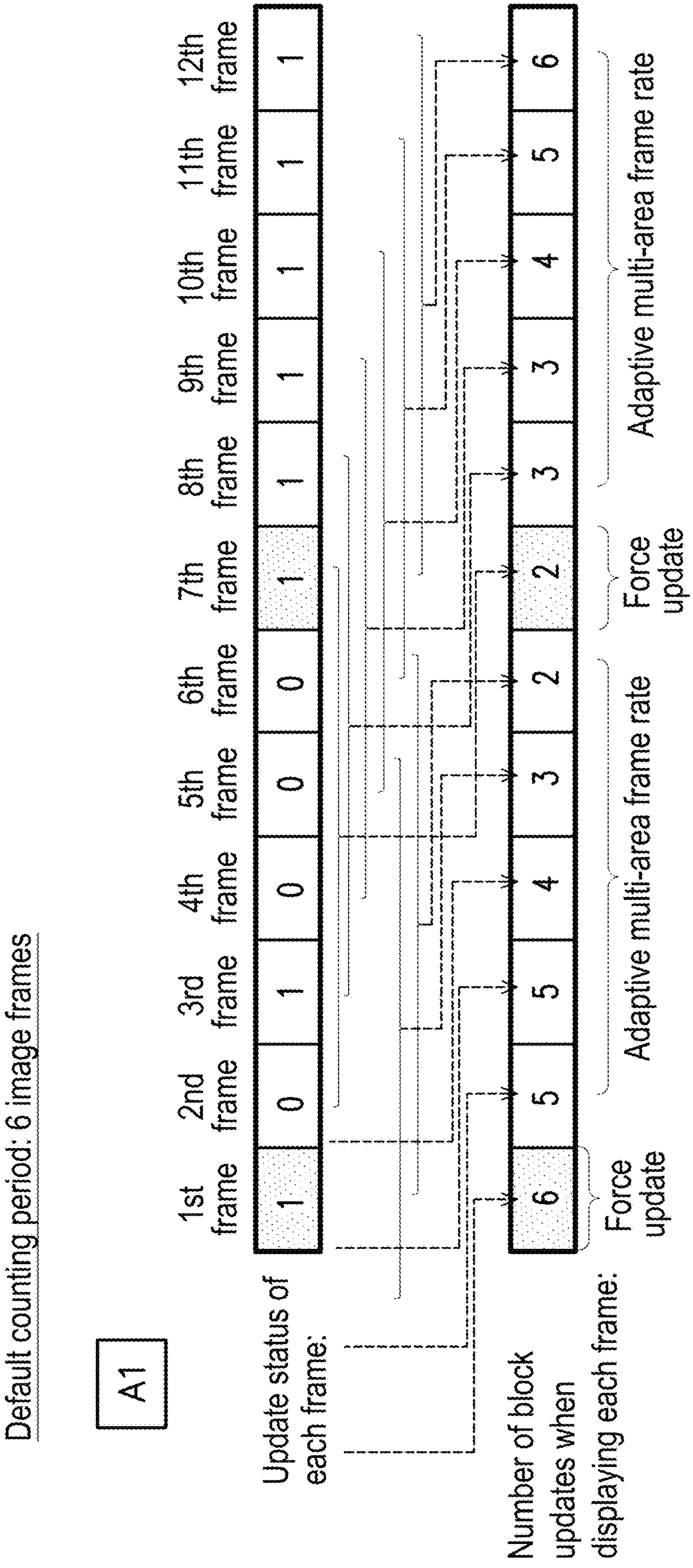
FIG. 10 is a schematic diagram of the number of block updates after executing another screen update instruction sequence shown according to another embodiment of the invention.

The existence of the forced update mechanism affects the number of area updates of each of the display areas. Referring to FIG. 10, via the setting of the main frequency of the display driver chip 100, the time of the display system may be divided into frame units, and at least one forced update is performed every fixed period. That is, one fixed period has two portions, namely a forced update frame and an adaptive multi-area frame rate (MAFR) frame. That is, the MAFR frame is between the frames that are forced to update.

Continuing the example of FIG. 9B, it is assumed that the update status of the 1st to 12th frames is "1, 0, 1, 0, 0, 0, 1, 1, 1, 1, 1, 1". In addition, it is assumed that at the first frame, the number of area updates is 6, and the default counting period is 6 frames. In the above case, the number of area updates counted after the second frame is "5, 5, 4, 3, 2, 2, 3, 3, 4, 5, 6". For example, at the sixth frame, the number of area updates corresponding to the display area A1 is the sum of the update statuses of the 1st frame to the 6th frame, that is, 1+0+1+0+0+0=2. At the 7th frame, due to the forced update instruction, the update status is "1", and the corresponding number of area updates is the sum of the update statuses of the 2nd frame to the 7th frame, which is "2", and so on.

In the present embodiment, when multi-area frame frequency compensation is initially run, the number of area updates of all of the display areas is reset to the maximum value corresponding to the default counting period. For example, the default counting period is 6 frames, and the number of area updates is reset to 6. In this way, when initially running multi-area frame frequency compensation, the display driver chip 100 may perform initial compensation using the compensation parameter set with the highest frame rate.

Figure 11:
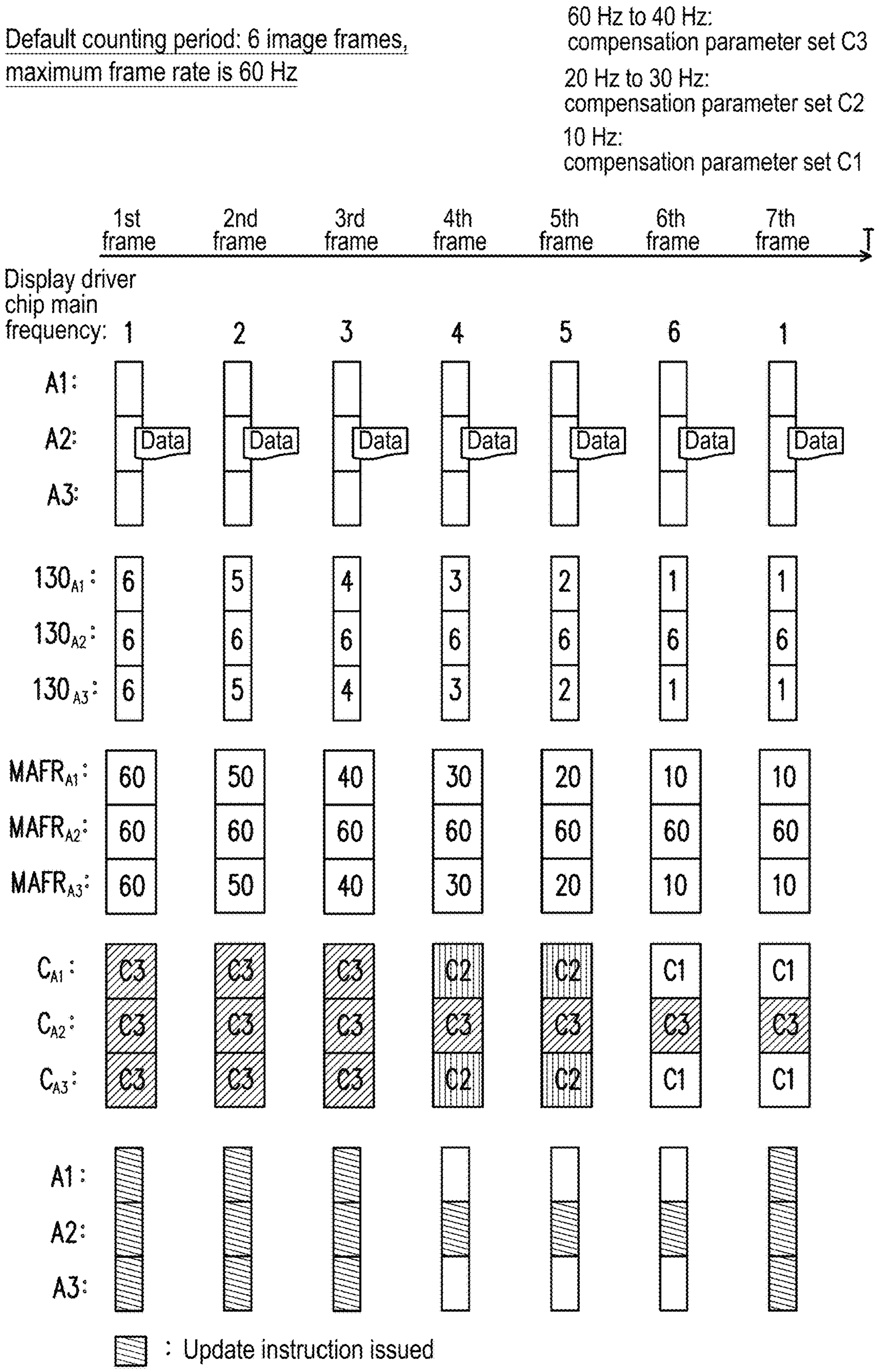
FIG. 11 is a timing diagram of a plurality of display areas applying a multi-area frame rate shown according to an embodiment of the invention.

Please refer to FIG. 11. It is assumed that every 6 frames of the main frequency of the display driver chip is one cycle, the default counting cycle is 6 frames, and the maximum frame rate is 60 Hz. Moreover, it is further assumed that the display panel is divided into three display areas A1 to A3, and the display driver chip 100 is set to a frame rate corresponding to 60 Hz to 40 Hz, and the compensation parameter set is C3; corresponding to the frame rate of 30 Hz to 20 Hz, the compensation parameter set is C2; corresponding to the frame rate of 10 Hz, the compensation parameter set is C1.

In the present embodiment, according to the received display stream data, the 1st to 7th frames all have image data (for example, image data in MIPI protocol format) that need to be sent to the display area A2 for display/update of the screen.

As shown in FIG. 11, in the initial 1st frame, the area count registers $\mathbf{130}_{A1}$ to $\mathbf{130}_{A3}$ corresponding to the display areas A1 to A3 are all reset to 6; the frame rates ($MAFR_{A1}$ to $MAFR_{A3}$) are all calculated as 60 Hz; the set compensation parameter set is C3. Next, in the 2nd to 6th frames, since only the display area A2 needs to display new image data, the images displayed in the display areas A1 and A3 do not need to be updated, and the number of area updates recorded in the area count registers $130_{A1}$ and $130_{A3}$ corresponding to the display areas A1 and A3 respectively is reduced to 5 to 1; the frame rates ($MAFR_{A1}$, $MAFR_{A3}$) are both calculated as 50 Hz to 10 Hz; the set compensation parameter set is C3 to C1.

Next, in the next cycle, the main frequency returns to 1, that is, entering the 7th frame, only the display area A2 needs to display new image data. The images displayed in the display areas A1 and A3 do not need to be updated, but all display areas A1 to A3 are issued a forced update instruction. In this case, the number of area updates recorded in the area count registers $130_{A1}$ and $130_{A3}$ corresponding to the display areas A1 and A3 respectively is 1; the frame rates ($MAFR_{A1}$, $MAFR_{A3}$) are both calculated as 10 Hz; the set compensation parameter set is C1.

It should be noted that in the present embodiment, the display driver chip 100 is configured to issue a forced update instruction to all of the display areas in several initial frames (e.g., 3) to update all of the display areas at once, but the invention is not limited thereto. For example, in another embodiment, only the first initial frame issues a forced update instruction to all of the display areas, so that all of the display areas are updated at once.

It should be noted that in the 4th to 6th frames, since only the display area A2 needs to be updated (since there is new display data), the traditional power consumption for updating the display areas A1 and A3 may be reduced, thus achieving the energy-saving effect of multi-area frame rate.

It is worth mentioning that, in addition to the timing point after the image of each of the image frames of the display stream data is displayed, in addition to performing the multi-area frame rate calculation operation to obtain the frame rate of each of the display areas, the display driver chip 100 may perform the multi-area frame rate calculation operation at other timing points. These other timings include: when the display driver chip receives a command from the application processor to perform local scanning or power-saving mode; when the display driver chip determines that the display panel is displaying images and a touch operation is not detected in a predetermined time; and when the display driver chip receives a local scanning instruction from the application processor and the touch operation is not detected in another predetermined time.

After the calculated frame rate is obtained, during the next frame or after N frame intervals, the display driver chip 100 adjusts the voltage level of the corresponding scan signal or gate signal according to the frame rate determined by each of the display areas or scan lines. This precise control enables the display driver chip 100 to achieve the object of controlling whether corresponding scan lines or scan lines in a specific area should be updated, thereby reducing energy consumption from updating the entire area.

Based on the above, the adaptive multi-area frame rate display system and the adopted adaptive multi-area frame rate display method provided by the invention may adaptively obtain the frame rate of each of the display areas and apply the corresponding optical compensation parameters. In this system, even if the application processor or the host processor does not specify the specific frame rate of each of the display areas, the display driver chip may still adaptively calculate the current frame rate of each of the display areas and apply the corresponding compensation parameter set, thus eliminating the need of external control. Therefore, the need for the application processor (AP) to issue an instruction to instruct each of the display areas to refresh is eliminated, making the entire display process more autonomous and efficient, simplifying the operation process, reducing resource consumption and improving display efficiency, thus effectively overcoming the issues existing in traditional methods, that is, a large amount of resources need to be invested in compensation adjustments while saving energy.

What is claimed is:

1. An adaptive multi-area frame rate display system, comprising:

a display panel divided into a plurality of display areas;

an application processor providing display stream data, wherein the display stream data comprises a plurality of area display stream data corresponding to the plurality of display areas;

a display driver chip coupled to the display panel and the application processor, receiving the display stream data, and calculating a frame rate of each of the plurality of display areas, wherein in the operation of calculating the frame rate of each of the plurality of display areas, the display driver chip calculates the frame rate of each of the plurality of display areas according to an image update status of the plurality of display areas in a past default counting period, wherein the display driver chip sets a plurality of area count registers respectively corresponding to the plurality of display areas according to the plurality of divided display areas, wherein in the operation of calculating the frame rate of each of the plurality of display areas according to the image update status of the plurality of display areas in the past default counting period:

after each display of a latest image frame of the display stream data, an area count register of each of the display areas counts a total number of times each of the display areas is updated in the past default counting period as a number of area updates, wherein the display driver chip calculate a frame rate MAFR(i) of an i-th display area according to a following formula:

$$MAFR(i) = \frac{C_i}{P_{prset}} \times FUR_{max}$$

wherein $C_i$ is a number of area updates of the i-th display area; $P_{prset}$ is the past default counting period; $FUR_{max}$ is a maximum frame rate of the display panel, wherein the display driver chip further selects a plurality of pre-configured compensation parameter sets corresponding to the plurality of display areas according to the frame rate of each of the plurality of display areas to compensate the plurality of area display stream data corresponding to the plurality of display areas by directly applying the selected pre-configured compensation parameter set.

2. The adaptive multi-area frame rate display system of claim 1, wherein the display driver chip sets a position, a size, and a total number of the plurality of display areas according to at least one of a plurality of specifications corresponding to the display panel, and the plurality of specifications comprise:

a total number of a plurality of data lines of the display panel; and a total number of a plurality of scan lines of the display panel.

3. The adaptive multi-area frame rate display system of claim 1, wherein the display driver chip sets a plurality of frame count registers respectively corresponding to the plurality of display areas according to the plurality of divided display areas, wherein each of the frame count registers has a plurality of bits, a total number of the plurality of bits corresponds to a length of the past default counting period, and a plurality of bit values recorded by the plurality of bits respectively indicate an update status of a plurality of image frames in the past default counting period, wherein whenever an image of a display area is updated in a latest image frame, a frame count register corresponding to the display area discards a bit value corresponding to an earliest image frame in the plurality of bit values, performs a translation on a plurality of remaining bit values so that a bit corresponding to the latest image frame is empty, and records a first value to the bit corresponding to the latest image frame, wherein whenever an image of a display area is not updated in the latest image frame, the frame count register corresponding to the display area discards the bit value corresponding to the earliest image frame in the plurality of bit values, performs the translation on the plurality of remaining bit values so that the bit corresponding to the latest image frame is empty, and records a second value to the bit corresponding to the latest image frame.

4. The adaptive multi-area frame rate display system of claim 3, wherein in the operation of counting the total number of times each of the display areas is updated in the past default counting period, the area count register of each of the display areas accumulates a plurality of bit values recorded in a corresponding frame count register to obtain a sum, wherein the area count register of each of the display areas records the sum, and the sum is the total number of times each of the display areas is updated in the past default counting period.

5. The adaptive multi-area frame rate display system of claim 1, wherein the display driver chip sets a length of the past default counting period according to a maximum frame rate of the display panel, wherein the maximum frame rate is a multiple of the past default counting period.

6. The adaptive multi-area frame rate display system of claim 1, wherein the display driver chip issues a forced update instruction every past default counting period to control the display panel to update images of all of the display areas every past default counting period.

7. The adaptive multi-area frame rate display system of claim 1, wherein the display driver chip further calculates the frame rate of each of the plurality of display areas at one of following opportunities:

after an image of each image frame of the display stream data is displayed;

when the display driver chip receives a command from the application processor to perform a local scanning or a power-saving mode;

when the display driver chip determines that the display panel is displaying an image and a touch operation is not detected in a predetermined time; and when the display driver chip receives an instruction of the local scanning from the application processor and the touch operation is not detected in another predetermined time.

8. An adaptive multi-area frame rate display method, configured for an adaptive multi-area frame rate display system, wherein the system comprises a display panel, an application processor, and a display driver chip, and the method comprises:

dividing the display panel into a plurality of display areas via the display driver chip;

providing display stream data via the application processor, wherein the display stream data comprises a plurality of area display stream data corresponding to the plurality of display areas;

receiving the display stream data from the application processor and calculating a frame rate of each of the plurality of display areas via the display driver chip; and selecting a plurality of pre-configured compensation parameter sets corresponding to the plurality of display areas according to the frame rate of each of the plurality of display areas via the display driver chip to compensate the plurality of area display stream data corresponding to the plurality of display areas by directly applying the selected pre-configured compensation parameter set, wherein the step of calculating the frame rate of each of the plurality of display areas comprises: calculating the frame rate of each of the plurality of display areas according to an image update status of the plurality of display areas in a past default counting period;

further comprising: setting a plurality of area count registers respectively corresponding to the plurality of display areas according to the plurality of divided display areas via the display driver chip, wherein the step of calculating the frame rate of each of the plurality of display areas according to the image update status of the plurality of display areas in the past default counting period comprises:

counting a total number of times each of the display areas is updated in the past default counting period as a number of area updates via an area count register of each of the display areas after each display of a latest image frame of the display stream data; and calculating a frame rate MAFR(i) of an i-th display area according to a following formula via the display driver chip:

$$MAFR(i) = \frac{C_i}{P_{prset}} \times FUR_{max}$$

wherein $C_i$ is a number of area updates of the i-th display area; $P_{prset}$ is the past default counting period; $FUR_{max}$ is a maximum frame rate of the display panel.

9. The adaptive multi-area frame rate display method of claim 8, further comprising:

setting a position, a size, and a total number of the plurality of display areas according to at least one of a plurality of specifications corresponding to the display panel, and the plurality of specifications comprise:

a total number of a plurality of data lines of the display panel; and a total number of a plurality of scan lines of the display panel.

10. The adaptive multi-area frame rate display method of claim 8, further comprising:

setting a plurality of frame count registers respectively corresponding to the plurality of display areas according to the plurality of divided display areas via the display driver chip, wherein each of the frame count registers has a plurality of bits, a total number of the plurality of bits corresponds to a length of the past default counting period, and a plurality of bit values recorded by the plurality of bits respectively indicate an update status of a plurality of image frames in the past default counting period;

discarding a bit value corresponding to an earliest image frame in the plurality of bit values, performing a translation on a plurality of remaining bit values so that a bit corresponding to the latest image frame is empty, and recording a first value to the bit corresponding to the latest image frame via a frame count register corresponding to a display area whenever an image of the display area is updated in the latest image frame; and discarding the bit value corresponding to the earliest image frame in the plurality of bit values, performing the translation on the plurality of remaining bit values so that the bit corresponding to the latest image frame is empty, and recording a second value to the bit corresponding to the latest image frame via the frame count register corresponding to the display area whenever the image of the display area is not updated in the latest image frame.

11. The adaptive multi-area frame rate display method of claim 10, wherein the step of counting the total number of times each of the display areas is updated in the past default counting period comprises:

accumulating a plurality of bit values recorded in a corresponding frame count register via the area count register of each of the display areas to obtain a sum; and recording the sum via the area count register of each of the display areas, wherein the sum is the total number of times each of the display areas is updated in the past default counting period.

12. The adaptive multi-area frame rate display method of claim 8, further comprising:

setting a length of the past default counting period according to a maximum frame rate of the display panel via the display driver chip, wherein the maximum frame rate is a multiple of the past default counting period.

13. The adaptive multi-area frame rate display method of claim 8, further comprising: issuing a forced update instruction every past default counting period via the display driver chip to control the display panel to update images of all of the display areas every past default counting period.

14. The adaptive multi-area frame rate display method of claim 8, further comprising:

calculating the frame rate of each of the plurality of display areas at one of following opportunities via the display driver chip:

after an image of each image frame of the display stream data is displayed;

when the display driver chip receives a command from the application processor to perform a local scanning or a power-saving mode;

when the display driver chip determines that the display panel is displaying an image and a touch operation is not detected in a predetermined time; and when the display driver chip receives an instruction of the local scanning from the application processor and the touch operation is not detected in another predetermined time.

* * * * *